United States Patent
Horiba

(10) Patent No.: US 12,272,083 B2
(45) Date of Patent: Apr. 8, 2025

(54) DISTANCE ESTIMATION DEVICE

(71) Applicant: TOYOTA JIDOSHA KABUSHIKI KAISHA, Toyota (JP)

(72) Inventor: Kazuki Horiba, Shizuoka-ken (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 414 days.

(21) Appl. No.: 17/821,544

(22) Filed: Aug. 23, 2022

(65) Prior Publication Data

US 2023/0134330 A1  May 4, 2023

(30) Foreign Application Priority Data

Nov. 1, 2021  (JP) .................. 2021-179069

(51) Int. Cl.
*G06T 7/50* (2017.01)
*G06T 5/80* (2024.01)
*G06T 7/00* (2017.01)
*G06T 7/60* (2017.01)

(52) U.S. Cl.
CPC .............. *G06T 7/50* (2017.01); *G06T 5/80* (2024.01); *G06T 7/0002* (2013.01); *G06T 7/60* (2013.01); *G06T 2207/10024* (2013.01); *G06T 2207/30168* (2013.01); *G06T 2207/30252* (2013.01)

(58) Field of Classification Search
CPC .......... G06T 7/50; G06T 5/80; G06T 7/0002; G06T 7/60; G06T 2207/10024; G06T 2207/30168; G06T 2207/30252; G06T 5/94
See application file for complete search history.

(56) References Cited

U.S. PATENT DOCUMENTS

| | | | |
|---|---|---|---|
| 2009/0147116 A1 | 6/2009 | Koyama et al. | |
| 2010/0172542 A1* | 7/2010 | Stein | G06V 20/588 348/148 |
| 2019/0049964 A1* | 2/2019 | Jang | G06V 20/64 |
| 2019/0246477 A1* | 8/2019 | Sinitsyn | H05B 47/125 |
| 2020/0134333 A1* | 4/2020 | Vishal | G06F 18/2451 |

(Continued)

FOREIGN PATENT DOCUMENTS

| | | |
|---|---|---|
| JP | 6378299 A | 4/1988 |
| JP | 2009141813 A | 6/2009 |

(Continued)

OTHER PUBLICATIONS

Traffic Light Mapping, Localization, and State Detection for Autonomous Vehicles—2011 (Year: 2011).*

(Continued)

*Primary Examiner* — Nizar N Sivji
(74) *Attorney, Agent, or Firm* — Dickinson Wright, PLLC

(57) ABSTRACT

A vehicle includes a distance estimation device that estimates the distance from the vehicle to a traffic light. The distance estimation device includes an image acquisition unit that acquires an image captured by a camera for imaging the surroundings of the vehicle, a light size acquisition unit that acquires a light size of a light of the traffic light reflected in the image, and a distance estimation unit that estimates the distance from the vehicle to the traffic light based on the light size. The light size acquisition unit removes flare of the light in the image, and acquires the light size in the image after the flare is removed.

3 Claims, 3 Drawing Sheets

(56) References Cited

U.S. PATENT DOCUMENTS

| | | | | |
|---|---|---|---|---|
| 2020/0151468 A1* | 5/2020 | Hermalyn | ............ | G06V 10/141 |
| 2020/0265250 A1* | 8/2020 | Oe | ..................... | G08G 1/09623 |
| 2023/0159053 A1* | 5/2023 | Hershkovich | ...... | G01C 21/3889 |
| | | | | 701/25 |

FOREIGN PATENT DOCUMENTS

| | | | | | |
|---|---|---|---|---|---|
| JP | 2009152921 A | * | 7/2009 | ........... | H04N 5/3572 |
| JP | 2019109602 A | * | 7/2019 | | |
| WO | WO-2016125377 A1 | * | 8/2016 | | |

OTHER PUBLICATIONS

Aalborg University Ongoing Work of Traffic Lights—2015 (Year: 2015).*

* cited by examiner

DISTANCE ESTIMATION DEVICE

CROSS-REFERENCE TO RELATED APPLICATION

This application claims priority to Japanese Patent Application No. 2021-179069 filed on Nov. 1, 2021, incorporated herein by reference in its entirety.

BACKGROUND

1. Technical Field

The disclosure relates to a distance estimation device, a distance estimation method, and a storage medium.

2. Description of Related Art

In the related art, a device has been suggested in which an in-vehicle sensor captures an image of a traffic light in front of a vehicle and estimates the distance from the vehicle to the traffic light based on a size of a light of the traffic light in the image. Japanese Unexamined Patent Application Publication No. 63-78299 (JP 63-78299 A) describes an automobile having a signal recognition device that calculates a distance to a traffic light by extracting an area of high brightness in an image signal captured by a forward image capturing camera, performing enclosing with a window based on the size and color of the area, detecting an edge in the window, and comparing the detected edge with a reference traffic light edge stored in advance.

SUMMARY

In the device described in JP 63-78299 A, the distance from the vehicle to the traffic light is estimated based on the light size of the traffic light in the image, but when the light of the traffic light is captured in a dark surrounding condition such as at night, flare may occur in the image. Flare is a phenomenon in which an image expands due to the spread of light caused by multiple reflections of incident light in a camera. Since the light of the traffic light appears to expand in the image due to the flare, the light size cannot be acquired correctly, and it is likely to incorrectly estimate a distance.

The disclosure has been made to solve the above-mentioned problem, and is to accurately estimate a distance even when the surroundings are dark such as at night.

A first aspect of the disclosure relates to a distance estimation device that estimates a distance from a vehicle to a traffic light. The distance estimation device includes an image acquisition unit, a light size acquisition unit, and a distance estimation unit. The image acquisition unit is configured to acquire an image captured by a sensor for imaging surroundings of the vehicle. The light size acquisition unit is configured to acquire a light size of a light of the traffic light reflected in the image. The distance estimation unit is configured to estimate the distance from the vehicle to the traffic light based on the light size. The light size acquisition unit is configured to remove flare of the light in the image, and acquire the light size in the image after the flare is removed.

With the distance estimation device according to the first aspect of the disclosure, even when the light of the traffic light is captured in a dark surrounding condition, the flare in the image is removed and then the light size in the image is acquired. Therefore, it is possible to accurately estimate the distance from the vehicle to the traffic light.

In the first aspect of the disclosure, the distance estimation device may further include a storage unit configured to store a known flare brightness pattern in the captured image of the sensor, in which the light size acquisition unit may be configured to acquire a light brightness pattern of the light in the image, search for a portion of the light brightness pattern that matches the flare brightness pattern in shape, and remove the flare of the light in the image by subtracting the flare brightness pattern from the light brightness pattern in the portion that matches in shape. In this case, since the flare is removed using the known flare brightness pattern stored in the storage unit, the flare can be removed by a simple method.

Further, in the distance estimation device according to the first aspect of the disclosure, the flare of the light in the image may be removed and flare of a light other than the light of the traffic light may not be removed. In this case, since the flare of the light other than the light of the traffic light is not removed in the image, the calculation load can be suppressed.

In the distance estimation device according to the first aspect of the disclosure, the storage unit may be configured to store two or more flare brightness patterns corresponding to light colors of lights of the traffic light, and the light size acquisition unit may be configured to select a flare brightness pattern corresponding to a light color of the light in the image from among the two or more flare brightness patterns and remove the flare of the light in the image by subtracting the selected flare brightness pattern from the light brightness pattern. In this case, since the flare brightness pattern corresponding to the light color of the light of the traffic light is selected and used for removing the flare, the light size can be acquired more appropriately.

A second aspect of the disclosure relates to a distance estimation method for estimating a distance from a vehicle to a traffic light. The distance estimation method includes an image acquisition step of acquiring an image captured by a sensor for imaging surroundings of the vehicle, a light size acquisition step of acquiring a light size of a light of the traffic light reflected in the image, and a distance estimation step of estimating the distance from the vehicle to the traffic light based on the light size. The light size acquisition step includes removing flare of the light in the image, and acquiring the light size in the image after the flare is removed.

With the distance estimation method according to the second aspect of the disclosure, even when the light of the traffic light is captured in a dark surrounding condition, the flare in the image is removed and then the light size in the image is acquired. Therefore, it is possible to accurately estimate the distance from the vehicle to the traffic light.

Further, a third aspect of the disclosure relates to a storage medium storing a program. The program causes a computer to execute the above-mentioned distance estimation method. The storage medium according to the third aspect of the disclosure stores the program that is able to cause a computer to execute the distance estimation.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Embodiment of Disclosure

Hereinafter, a distance estimation device according to an embodiment of the disclosure will be described with reference to the drawings.

Figure 1:
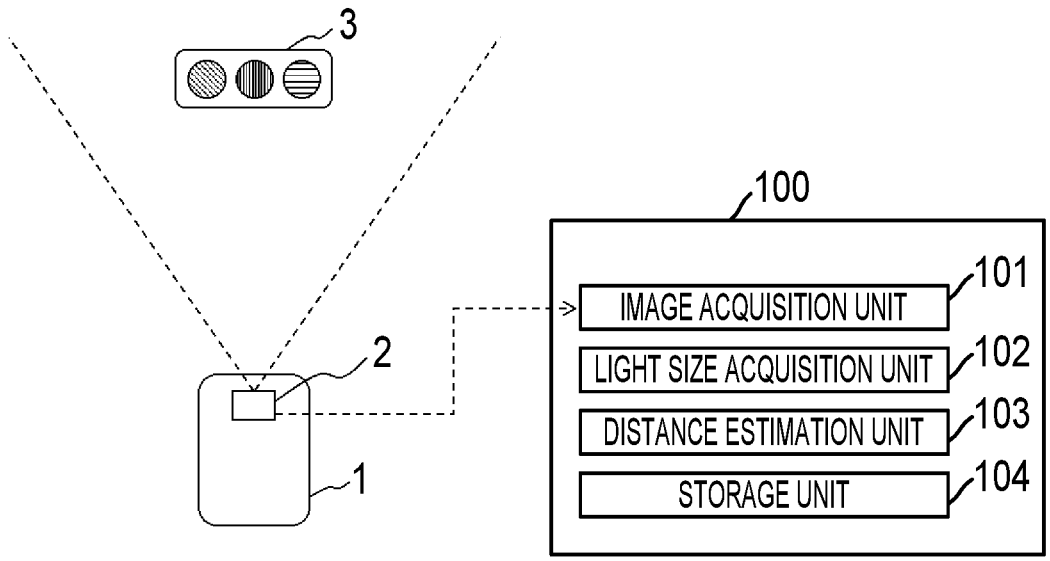
FIG. 1 is a diagram showing a configuration of a vehicle (1) according to an embodiment of the disclosure.

A vehicle 1 shown in FIG. 1 includes a camera 2 and a distance estimation device 100. The vehicle 1 has a travel assistance function that assists at least one of driving, steering, and braking, and is, for example, a vehicle classified as level 1 or higher in the definition of the autonomous driving level of Society of Automotive Engineers (SAE).

The camera 2 is installed so as to be able to capture an image of a traffic light 3 existing around (for example, in front of) the vehicle 1. The camera 2 transmits the captured image to an image acquisition unit 101 of the distance estimation device 100.

The distance estimation device 100 is a device that estimates the distance from the vehicle 1 to the traffic light 3. The estimated distance from the vehicle 1 to the traffic light 3 is used to implement the travel assistance function of the vehicle 1. For example, in a function of notifying a driver when the traffic light 3 is within a predetermined distance range from the vehicle 1, or a function of assisting the stop of the vehicle 1 in front of the traffic light when the light color of the traffic light is yellow or red, the distance from the vehicle 1 to the traffic light 3 is used.

The distance estimation device 100 may include one computer or a part or all of one or a plurality of computers. The computer includes a central processing unit (CPU), a read only memory (ROM), a random access memory (RAM), an input port, an output port, and the like. The distance estimation device 100 is implemented by installing, on the computer, a program for operating the computer as the distance estimation device 100. The distance estimation device 100 communicates with each part of the vehicle 1 through the input port and the output port, and transmits and receives data to and from each part. In particular, the distance estimation device 100 receives an image from the camera 2 that images the surroundings of the vehicle 1, and transmit data on the distance from the vehicle 1 to the traffic light 3 to a travel assistance device or the like that assists the travel of the vehicle 1.

The distance estimation device 100 includes the image acquisition unit 101, a light size acquisition unit 102, a distance estimation unit 103, and a storage unit 104 as functional configurations.

The image acquisition unit 101 acquires an image captured by the camera 2. The acquired image is passed to the light size acquisition unit 102.

The light size acquisition unit 102 acquires the light size of light of the traffic light 3 reflected in the image. The light size is the size of the light reflected in the image. When flare, which will be described later, occurs in the image, the light size is the size of the light after the flare is subtracted. For example, the light size may be the diameter when the light of the traffic light is circular, or may be the length of one side or the length of the diagonal line when the light of the traffic light is square. Since the shape of the light of the traffic light differs depending on the country or region, the type of the traffic light (for example, the type of the signal for automobiles or pedestrians), or the like, the definition of the light size is appropriately used depending on the situation. Hereinafter, a case where the light of the traffic light is circular and the size of the light is the diameter will be described, but the disclosure is not limited thereto.

First, the light size acquisition unit 102 determines whether or not the light of the traffic light is present in the image captured by the camera 2. Here, an object having a high degree of similarity to a known traffic light image is searched for in the captured image, and, when the object having a high degree of similarity is detected, a determination is made that the light of the traffic light is present. Here, in determining whether or not the degree of similarity is high, a trained image discrimination model in which machine learning is performed using a known traffic light image is used. Alternatively, as another method of determining whether or not a light of a traffic light is present in the image, a method of determining whether or not there is a pixel of a color corresponding to the light color (red, blue, or yellow) of the light of the traffic light in the image, and when the pixel is present, determining that the light of the traffic light is present may be used. On the road, there are few lights other than the traffic light that have the same color as the light color of the traffic light, and accordingly, when the determination is made that there is a pixel of the color corresponding to the light color, the determination is made that the traffic light is present in the image. Further, the light size acquisition unit 102 may determine whether or not the light of the traffic light is present in the image by another method.

Figure 2:
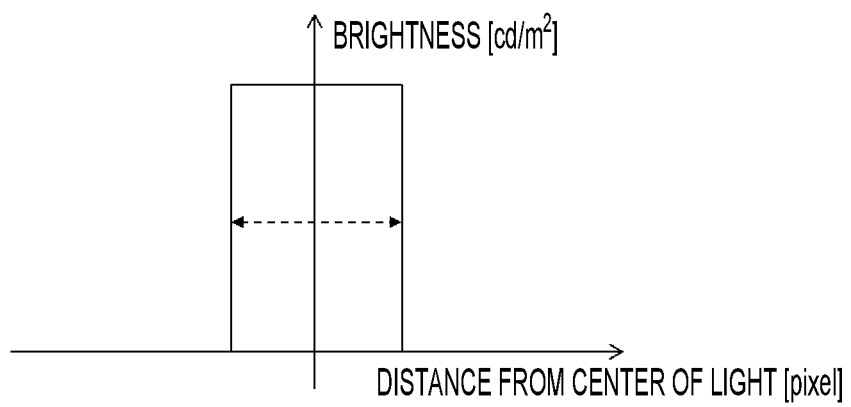
FIG. 2 is a diagram showing a light brightness pattern.

When the determination is made that the light of the traffic light is present in the image, the light size acquisition unit 102 acquires the light size. First, the light brightness pattern of the light in the image as shown in FIG. 2 is acquired. The light brightness pattern can be acquired, for example, by setting a line segment that passes through the center of the light in the image and measuring a brightness profile of each pixel on the line segment. Just one line segment may be set and the profile may be measured on the line segment; as an alternative, a plurality of line segments may be set, a profile in each of the line segments may be measured, and the averaged profile may be used as the brightness pattern. In addition, various image corrections may be performed before or after measuring the brightness profile. For example, brightness noise may be removed by high-pass filter processing or moving average processing. In addition, tilt correction may be performed such that the light looks circular in the image.

Next, the light size acquisition unit 102 measures the length between the portions exhibiting a steep rise on the brightness pattern, as shown by a dotted arrow in FIG. 2, and acquires the length as the light size. Alternatively, the light size may be acquired by other methods. For example, the length of an area on the brightness pattern where the brightness is equal to or greater than a predetermined brightness threshold value may be used as the light size, or the edges of the brightness pattern may be detected and the distance between the edges may be used as the light size.

As described above, the light size acquisition unit 102 acquires the light size in the image.

Referring back to FIG. 1, the description will be continuously given. The distance estimation unit 103 estimates the distance from the vehicle 1 to the traffic light 3 based on the light size acquired by the light size acquisition unit 102. The distance estimation unit 103 estimates the distance from the vehicle 1 to the traffic light 3 based on the light size on the image by using known parameters such as the lens magnification of the camera 2 and the size of the traffic light 3 (for example, 30 cm).

Figure 3A:
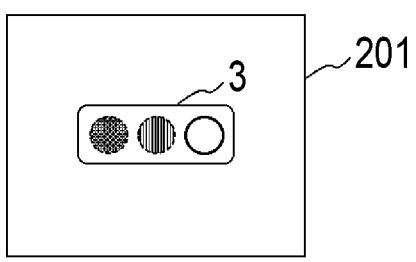
FIG. 3A is an image of lights of a traffic light captured when the surroundings are bright.
Figure 3B:
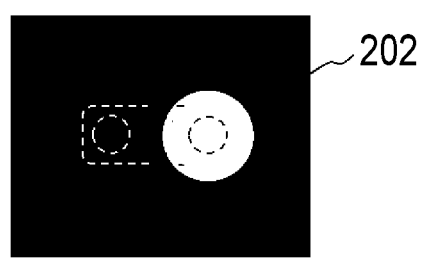
FIG. 3B is an image of lights of the traffic light captured when the surroundings are dark.

Incidentally, when the light of a traffic light is captured in a dark surrounding condition such as at night, flare may occur in the image. Flare is a phenomenon in which an image expands due to the spread of light caused by multiple reflections of incident light in a camera. For example, in an image 201 of FIG. 3A where the surroundings are bright, a state in which the light on the right side of the traffic light 3 is being lit is clearly reflected, whereas in an image 202 of FIG. 3B where the surroundings are dark, flare occurs around the light that is being lit on the right side and the light appears to be expanded. In such a case, the size of the light in the image cannot be acquired correctly, and it is likely that the distance will be estimated incorrectly.

Figure 4:
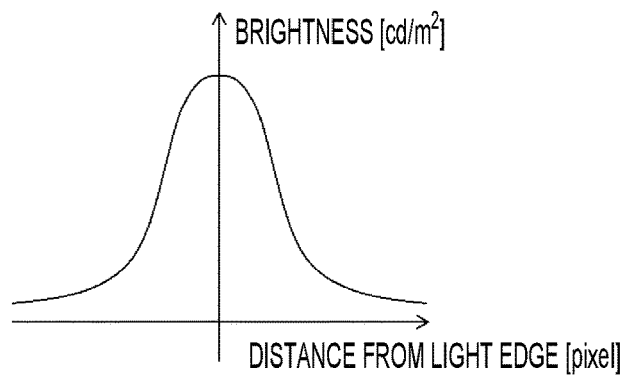
FIG. 4 is a diagram showing a flare brightness pattern.

Therefore, in the present embodiment, the light size acquisition unit 102 removes the flare prior to the acquisition of the light size. First, the light size acquisition unit 102 calls a known flare brightness pattern stored in the storage unit 104. The shape of the flare brightness pattern is shown in FIG. 4. Since the flare in the image is caused by the multiple reflection of light in the optical components such as the lens and the lens barrel included in the camera 2, the flare brightness pattern has a shape in accordance with the specifications (for example, reflectance, focal length, and the like) of the optical components included in the camera 2. Therefore, a flare brightness pattern corresponding to the camera 2 mounted on the vehicle 1 is obtained theoretically or experimentally in advance, and is stored in the storage unit 104 as a known flare brightness pattern.

Figure 5A:
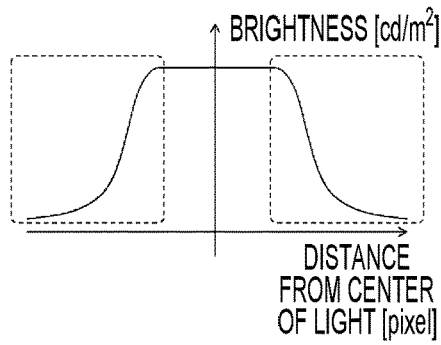
FIG. 5A is a diagram showing a light brightness pattern in an image captured when the surroundings are dark.

The light size acquisition unit 102 performs a processing operation of subtracting the flare brightness pattern from the brightness pattern of the light when flare occurs. First, the light size acquisition unit 102 acquires a light brightness pattern when flare occurs, as shown in FIG. 5A. The light brightness pattern of FIG. 5A has a shape in which the brightness gradually attenuates as the distance from the center of the light source increases, and does not have a portion where the brightness rises sharply as in the light brightness pattern of FIG. 3A. Therefore, it is difficult to acquire the light size as it is. Therefore, the light size acquisition unit 102 searches for a portion of the light brightness pattern of FIG. 5A that matches the flare brightness pattern of FIG. 4 called from the storage unit 104 in shape. Here, the search for the portion that matches in shape is performed by a mathematical method such as the least squares method. In addition, "matching in shape" may refer to a case where the shape of the flare brightness pattern obtained by enlarging or reducing the flare brightness pattern of FIG. 4 in the vertical direction and the shape of the light brightness pattern of FIG. 5A match each other. Further, the determination as to whether or not "the shapes match" is made, for example, by determining whether or not the sum of absolute values of the difference between the values at each point is below a predetermined matching determination threshold value. Portions surrounded by dotted lines in FIG. 5A are portions determined as portions that match the flare brightness pattern in shape.

Figure 5B:
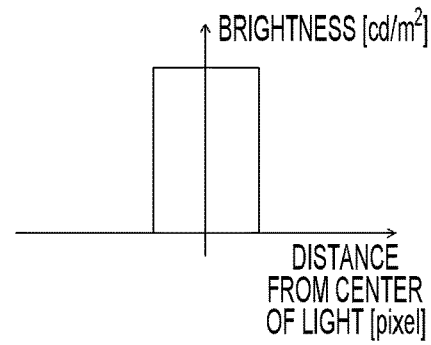
FIG. 5B is a diagram showing a light brightness pattern after subtracting the flare brightness pattern from the light brightness pattern.

The light size acquisition unit 102 subtracts the flare brightness pattern from the brightness pattern of FIG. 5A at the portion where the shapes match. FIG. 5B shows a light brightness pattern after subtraction. The light brightness pattern after subtraction includes a portion where the brightness rises sharply, similar to the light brightness pattern at the time of image capturing when the surroundings are bright. Using the light brightness pattern after subtraction, the light size acquisition unit 102 acquires the light size of the traffic light in the image.

Using the light size thus acquired, the distance estimation unit 103 estimates the distance from the vehicle 1 to the traffic light 3.

The light size acquisition unit 102 may be configured not only to remove the flare of the light of the traffic light in the image but also to remove the flare generated in the entire image. In this case, flare is removed from a light (a street light, brake lamps of a surrounding vehicle, and the like) other than the traffic light in the same manner as the traffic light.

On the other hand, the light size acquisition unit 102 may be configured to remove just the flare of the light of the traffic light in the image, and not to remove the flare of the light other than the traffic light (a street light, brake lamps of a surrounding vehicle, and the like). In this case, the calculation load of the distance estimation device 100 can be suppressed as compared with the case in which the flare generated in the entire image is removed.

By performing the above processing, the distance estimation device 100 of the present embodiment acquires the light size in the image after subtracting the influence of flare even when the light of the traffic light is captured in a dark surrounding condition. Therefore, the distance from the vehicle 1 to the traffic light 3 can be accurately estimated.

Figure 6:
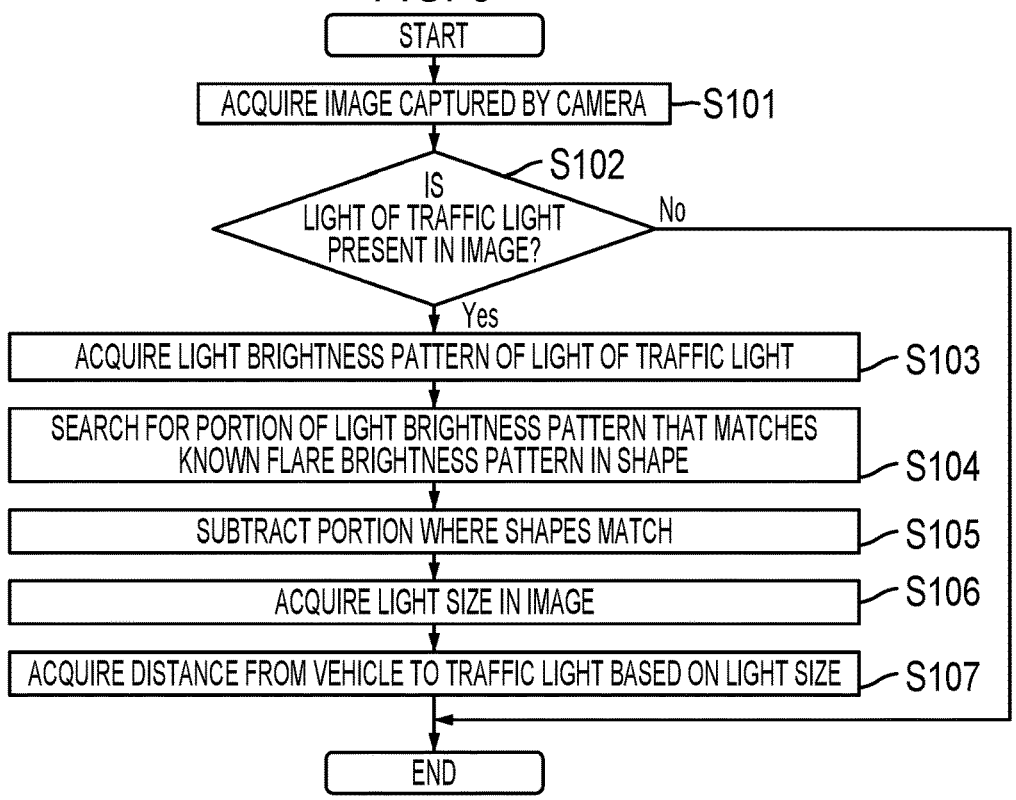
FIG. 6 is a flowchart showing a process of a distance estimation device (100)

Next, a process of the distance estimation device 100 of the present embodiment will be described with reference to a flowchart of FIG. 6. First, in step S101, the image acquisition unit 101 acquires an image captured by the camera 2. Next, in step S102, the light size acquisition unit 102 determines whether or not the light of the traffic light is present in the image. When the determination result is No, the process ends and the subsequent steps are omitted. That is, the flare is not removed in the image.

The process of removing flare imposes a high load on the arithmetic unit. In the present embodiment, flare is not removed when the light of the traffic light is not present in the image. For example, flare is not removed for a light other than the traffic light (a street light, brake lamps of surrounding vehicles, and the like). When the flare is removed from the light other than the traffic light as in the case of the light of the traffic light, an extra calculation that is not needed to estimate the distance puts a high load on the arithmetic unit. In the present embodiment, when the light of the traffic light is not present in the image, flare is not removed, and thus the calculation load can be suppressed.

Referring back to FIG. 6, the description will be continuously given. When the determination result of whether or not the light of the traffic light is present in the image is Yes in step S102, the light size acquisition unit 102 acquires the light brightness pattern of the light of the traffic light in step S103. Then, in step S104, the light size acquisition unit 102 searches for a portion of the light brightness pattern that matches the known flare brightness pattern in shape. The light size acquisition unit 102 subtracts the portion where the shapes of the light brightness pattern and the flare brightness pattern in step S105 match and then acquires the light size in the image in step S106. Finally, in step S107, the distance estimation unit 103 estimates the distance from the vehicle 1 to the traffic light 3 based on the light size.

As described above, the distance estimation device 100 of the present embodiment estimates the distance from the vehicle 1 to the traffic light 3 according to the flowchart described with reference to FIG. 6.

Another Embodiment of Disclosure

In another embodiment of the disclosure, the distance estimation device 100 stores a plurality of flare brightness patterns, and the distance estimation device 100 is used properly according to light colors of lights of the traffic light.

Figure 7:
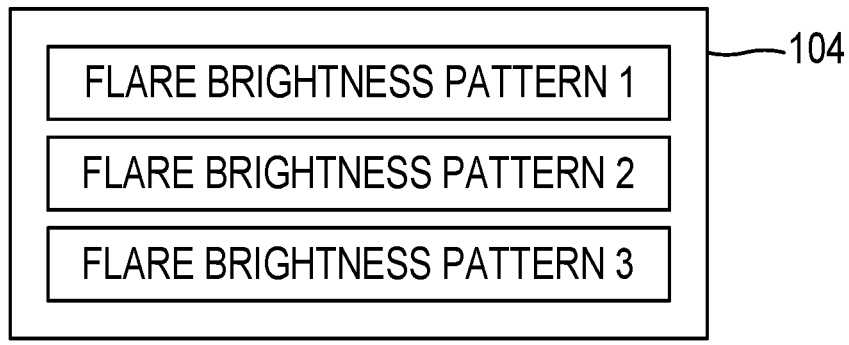
FIG. 7 is a diagram showing a storage unit (104) according to another embodiment of the disclosure.

As shown in FIG. 7, the storage unit 104 stores a flare brightness pattern 1, a flare brightness pattern 2, and a flare brightness pattern 3 as two or more flare brightness patterns. The light size acquisition unit 102 calls a flare brightness pattern corresponding to the light color of the traffic light from the storage unit 104 and uses the called flare brightness pattern for removing flare in the image. As described above, the flare is caused by the multiple reflection of light in the optical component such as the lens and the lens barrel included in the camera 2. Here, since the reflectance of light has a wavelength dependence, the shape of the flare brightness pattern changes with the light color of the light of the traffic light. By storing a plurality of flare brightness patterns corresponding to the light colors of the traffic light in advance in the storage unit 104, flare can be removed more appropriately.

Figure 8:
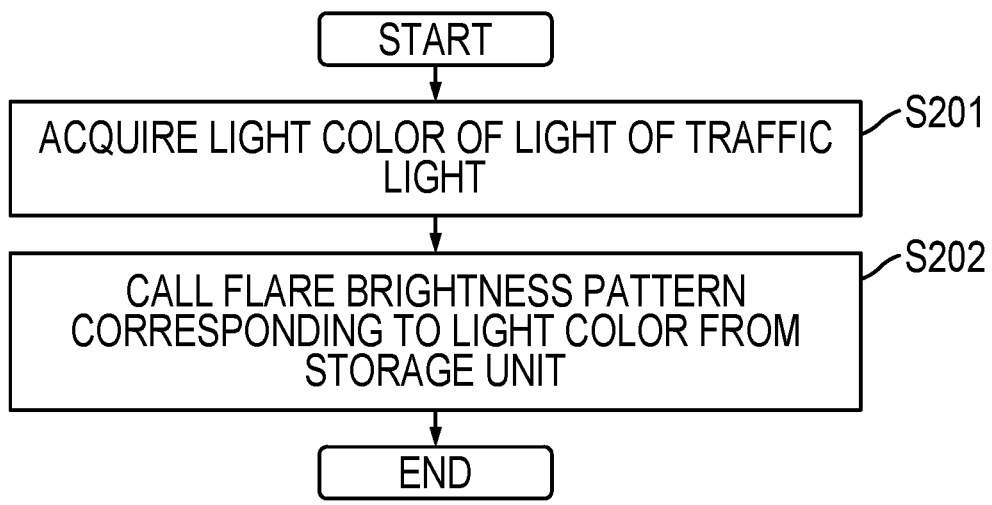
FIG. 8 is a flowchart showing a process of calling a flare brightness pattern from the storage unit (104) in the distance estimation device (100) according to another embodiment of the disclosure.

A flowchart of a process will be described with reference to FIG. 8. The process is performed in step S104 of FIG. 6. In step S201 of FIG. 8, the light size acquisition unit 102 acquires the light color of the light of the traffic light in the image. Next, in step S202, a flare brightness pattern corresponding to the light color is called from the storage unit. Flare removal is performed using the called flare brightness pattern.

Although the embodiment and the other embodiment of the disclosure have been described above, the disclosure is not limited to the embodiments. The disclosure can be implemented in various embodiments, including the embodiments, with various modifications and improvements based on the knowledge of those skilled in the art.

For example, the "traffic light" may include a railroad crossing warning light installed near the railroad crossing, a signal light at the entrance of a tollgate on a highway, and the like. In this case, the distance from the vehicle 1 to the railroad crossing warning light or the signal light at the entrance of the tollgate on the highway is estimated.

For example, the program according to the disclosure may be provided in a form stored in a recording medium readable by a computer. The recording medium that is readable by a computer can be, for example, a magnetic recording medium, an optical recording medium, or a semiconductor memory.

What is claimed is:

1. A distance estimation device that estimates a distance from a vehicle to a traffic light, the distance estimation device comprising a processor and a memory, wherein the processor is configured to:
    acquire an image captured by a sensor for imaging surroundings of the vehicle;
    store a known flare brightness pattern obtained from the image captured by the sensor in the memory;
    acquire a light size of a light of the traffic light reflected in the image;
    estimate the distance from the vehicle to the traffic light based on the light size,
    acquire a light brightness pattern of the light in the image;
    search for a portion of the light brightness pattern that matches the known flare brightness pattern in shape;
    remove flare of the light in the image by subtracting the known flare brightness pattern from the light brightness pattern in the portion that matches in shape, and
    acquire the light size in the image after the flare is removed.

2. The distance estimation device according to claim 1, wherein the processor is further configured to remove the flare of the light in the image and not to remove flare of a light other than the light of the traffic light.

3. The distance estimation device according to claim 1, wherein:
    the memory is further configured to store two or more flare brightness patterns corresponding to light colors of lights of the traffic light; and
    the processor is further configured to
        select a flare brightness pattern corresponding to a light color of the light in the image from among the two or more flare brightness patterns, and
        remove the flare of the light in the image by subtracting the selected flare brightness pattern from the light brightness pattern.

* * * * *